(12) United States Patent
Kanaya (10) Patent No.: US 11,256,849 B2
(45) Date of Patent: Feb. 22, 2022

(54) DOCUMENT PROCESSING APPARATUS AND NON-TRANSITORY COMPUTER READABLE MEDIUM

(71) Applicant: FUJIFILM Business Innovation Corp., Tokyo (JP)

(72) Inventor: Ryo Kanaya, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/935,208

(22) Filed: Jul. 22, 2020

(65) Prior Publication Data

US 2021/0286932 A1  Sep. 16, 2021

(30) Foreign Application Priority Data

Mar. 16, 2020 (JP) .............................. JP2020-045572

(51) Int. Cl.
*G06F 40/106* (2020.01)
*G06F 16/93* (2019.01)
*G06F 3/0482* (2013.01)
*G06Q 10/10* (2012.01)
*H04N 1/00* (2006.01)

(52) U.S. Cl.
CPC .......... *G06F 40/106* (2020.01); *G06F 3/0482* (2013.01); *G06F 16/93* (2019.01); *G06Q 10/10* (2013.01); *H04N 1/00* (2013.01)

(58) Field of Classification Search
CPC ...... G06F 16/93; G06F 40/151; G06F 40/166; G06F 40/226; G06Q 10/10; G06Q 10/1097
See application file for complete search history.

(56) References Cited

U.S. PATENT DOCUMENTS

| | | | | |
|---|---|---|---|---|
| 5,557,515 | A | * | 9/1996 | Abbruzzese ... G06Q 10/063114 705/7.15 |
| 8,094,976 | B2 | * | 1/2012 | Berard ..................... G06F 16/93 382/321 |
| 9,430,456 | B2 | * | 8/2016 | Lazarus ............... G06K 9/6253 |
| 10,762,142 | B2 | * | 9/2020 | Puzicha .................. G06F 40/10 |
| 2004/0181749 | A1 | * | 9/2004 | Chellapilla ........ G06K 9/00449 715/222 |

(Continued)

FOREIGN PATENT DOCUMENTS

CN 109101469 A * 12/2018 ........... G06K 9/6263
JP 2001022734 1/2001

(Continued)

OTHER PUBLICATIONS

English translation of JP_2014089526_A. 8 pages. (Year: 2014).*

*Primary Examiner* — Amy M Levy
(74) *Attorney, Agent, or Firm* — JCIPRNET (57) ABSTRACT

A document processing apparatus includes a processor configured to: display one or more documents stored in a specific document storage area on a first screen; display a first document selected on the first screen on a second screen that receives an operation for certain document processing; and in response to storage of a new document in the document storage area during execution of the document processing, display a second document which is the new document on the second screen without receiving selection of the second document on the first screen.

13 Claims, 5 Drawing Sheets

(56) References Cited

U.S. PATENT DOCUMENTS

| | | | | |
|---|---|---|---|---|
| 2004/0255218 | A1* | 12/2004 | Tada | G06K 9/72 |
| | | | | 714/747 |
| 2005/0289182 | A1* | 12/2005 | Pandian | G06K 9/00442 |
| 2009/0125509 | A1* | 5/2009 | Takebe | G06K 9/2081 |
| 2009/0132406 | A1* | 5/2009 | Brooks | G06Q 40/00 |
| | | | | 705/35 |
| 2011/0191259 | A1* | 8/2011 | Robinson | G06Q 20/102 |
| | | | | 705/342 |
| 2011/0255107 | A1* | 10/2011 | Blau | G06F 40/174 |
| | | | | 358/1.11 |
| 2013/0232040 | A1* | 9/2013 | Nuggehalli | G06K 9/2054 |
| | | | | 705/30 |
| 2014/0317147 | A1* | 10/2014 | Wu | G06Q 50/18 |
| | | | | 707/792 |
| 2015/0286636 | A1* | 10/2015 | Elkhou | G06Q 50/18 |
| | | | | 707/722 |
| 2017/0132462 | A1* | 5/2017 | Kiyozuka | G06K 9/2063 |
| 2019/0155873 | A1* | 5/2019 | Kondo | G06F 40/117 |
| 2019/0320080 | A1* | 10/2019 | Nakashima | H04N 1/00225 |
| 2020/0104586 | A1* | 4/2020 | Takahashi | G06K 9/00402 |
| 2021/0072933 | A1* | 3/2021 | Yasaki | G06F 3/1208 |

FOREIGN PATENT DOCUMENTS

| | | | |
|---|---|---|---|
| JP | 2008112214 | | 5/2008 |
| JP | 2010-033228 | | 2/2010 |
| JP | 2014089526 A | * | 5/2014 |
| JP | 2019186773 | | 10/2019 |

* cited by examiner

DOCUMENT SELECTING SCREEN

| | FILE NAME | FORM NAME | SCANNED AT | STATE |
|---|---|---|---|---|
| ☐ | FORM 000001 | STANDARD FORM 1 | 03/01/2020 10:00 | COMPLETED |
| ☐ | FORM 000002 | STANDARD FORM 2 | 03/01/2020 10:02 | BEING CHECKED |
| ☐ | FORM 000003 | STANDARD FORM 1 | 03/01/2020 10:02 | BEING CHECKED |
| ☐ | FORM 000004 | SPECIAL FORM 1 | 03/01/2020 10:08 | STANDBY |
| ☐ | FORM 000005 | STANDARD FORM 3 | 03/01/2020 10:12 | STANDBY |
| ☐ | FORM 000006 | STANDARD FORM 2 | 03/01/2020 10:13 | STANDBY |
| ☐ | FORM 000007 | SPECIAL FORM 1 | 03/01/2020 10:18 | STANDBY |
| ☐ | FORM 000008 | STANDARD FORM 2 | 03/01/2020 10:22 | STANDBY |
| ☐ | FORM 000009 | STANDARD FORM 1 | 03/01/2020 10:24 | STANDBY |

DISPLAY DOCUMENT

| NEW DOCUMENT | | | | | |
|---|---|---|---|---|---|
| FILE NAME | ADDED AT | | | | |
| FORM 000010 | 03/01/2020 10:42 | CHECK | CHECK IMMEDIATELY | IGNORE | |
| FORM 000011 | 03/01/2020 10:45 | CHECK | CHECK IMMEDIATELY | IGNORE | |
| FORM 000012 | 03/01/2020 10:51 | CHECK | CHECK IMMEDIATELY | IGNORE | |
| CHECK ALL | CHECK ALL IMMEDIATELY | IGNORE ALL | | | |

CLOSE
UPDATE

DOCUMENT PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-045572 filed Mar. 16, 2020.

BACKGROUND

(i) Technical Field

The present disclosure relates to a document processing apparatus and a non-transitory computer readable medium.

(ii) Related Art

There has been proposed exemplary technology for allowing, for example, in the case of checking the details of document files, the details of a plurality of document files stored in a specified folder to be checked by displaying a list of all or some of the details of the document files, instead of checking the document files one by one (for example, Japanese Unexamined Patent Application Publication No. 2001-22734). Other technologies of the related art include Japanese Unexamined Patent Application Publication Nos. 2008-112214, 2010-33228, and 2019-186773.

There are cases where one or more documents stored in a specific document storage area are displayed on a first screen, and a first document selected on the first screen is displayed on a second screen that receives an operation for certain document processing to perform the certain document processing on the first document. In response to storage of a new document in the specific document storage area during execution of the certain document processing on the second screen, a user needs to select the new document on the first screen and then execute the certain document processing on the new document on the second screen, which involves bothersome operations for the user.

SUMMARY

Aspects of non-limiting embodiments of the present disclosure relate to, in the case where one or more documents stored in a specific document storage area are displayed on a first screen, and a first document selected on the first screen is displayed on a second screen that receives an operation for certain document processing to perform the certain document processing on the first document, in response to storage of a new document in the document storage area during execution of document processing on the second screen, relieving the user from having to display the new document on the second screen.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a document processing apparatus including a processor configured to: display one or more documents stored in a specific document storage area on a first screen; display a first document selected on the first screen on a second screen that receives an operation for certain document processing; and in response to storage of a new document in the document storage area during execution of the document processing, display a second document which is the new document on the second screen without receiving selection of the second document on the first screen.

BRIEF DESCRIPTION OF THE DRAWINGS

An exemplary embodiment of the present disclosure will be described in detail based on the following figures, wherein:

FIG. 5 is a diagram illustrating an example of the display of a pop-up screen according to the present exemplary embodiment.

DETAILED DESCRIPTION

Hereinafter, an exemplary embodiment of the present disclosure will be described on the basis of the drawings.

Figure 1:
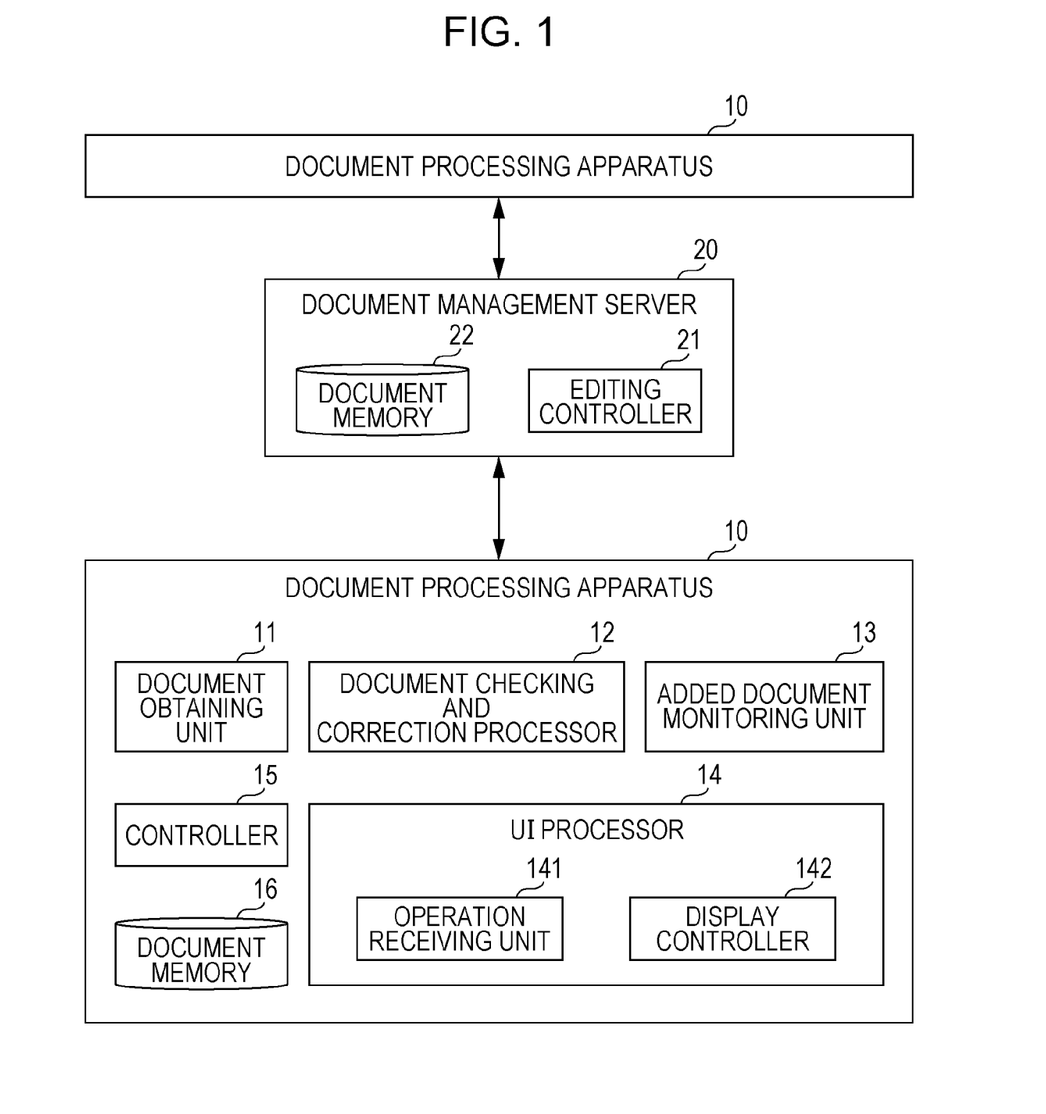
FIG. 1 is an overall configuration diagram illustrating a document processing system according to an exemplary embodiment.

FIG. 1 is an overall configuration diagram illustrating a document processing system according to the present exemplary embodiment. FIG. 1 illustrates a plurality of document processing apparatuses 10 and a document management server 20. The document processing system according to the present exemplary embodiment includes a plurality of document processing apparatuses 10; however, since these document processing apparatuses 10 only need to have an equivalent configuration, the functional blocks of only one document processing apparatus 10 are illustrated in FIG. 1.

The document management server 20 in the present exemplary embodiment may be realized by a hardware configuration of an existing general server computer. That is, the document management server 20 includes a central processing unit (CPU), storage units such as read-only memory (ROM), random-access memory (RAM), and a hard disk drive (HDD), and a network interface provided as a communication unit that performs communication with each document processing apparatus 10.

The document management server 20 in the present exemplary embodiment includes an editing controller 21 and document memory 22, and manages documents used in the system. Note that elements that are not used for description of the present exemplary embodiment are omitted in the drawings. The document memory 22 stores documents used in the system. The document memory 22 is provided with a specific document storage area shared by a plurality of users who use the document processing apparatuses 10. The editing controller 21 controls document editing while cooperating with the document processing apparatuses 10 such that a document stored in the specific document storage area will not be checked and corrected by a plurality of users.

The editing controller 21 in the document management server 20 is realized by cooperation between a computer that forms the document management server 20 and a program that runs on a CPU installed in the computer. In addition, the document memory 22 is realized by memory installed in the document management server 20.

Each document processing apparatus 10 in the present exemplary embodiment may be realized by a hardware configuration of an existing general computer such as a personal computer (PC). That is, each document processing apparatus 10 includes a CPU, storage units such as ROM, RAM, and an HDD, user interface units such as an input unit mouse, a keyboard, and a display provided as a display unit, and a network interface provided as a communication unit that performs communication with the document management server 20.

Each document processing apparatus 10 in the present exemplary embodiment includes a document obtaining unit 11, a document checking and correction processor 12, an added document monitoring unit 13, a user interface (UI) processor 14, a controller 15, and document memory 16. Note that elements that are not used for description of the present exemplary embodiment are omitted in the drawings.

The document obtaining unit 11 obtains, from the document management server 20, a document to be subjected to checking and correction processing. The document checking and correction processor 12 displays a document in response to a user operation, thus allowing the user to check the details of the document. In addition, the document checking and correction processor 12 performs, as certain document processing, checking and correction processing for allowing the user to correct a document as needed. The added document monitoring unit 13 monitors new addition and registration of a document in the specific document storage area of the document memory 22. The user interface processor 14 includes an operation receiving unit 141 and a display controller 142. The operation receiving unit 141 receives a user operation using the mouse, the keyboard, and/or the like. The display controller 142 controls the display on the display. The controller 15 controls the operation of each of the elements 11 to 14. The document memory 16 stores a document obtained from the document management server 20.

Each of the elements 11 to 15 of each document processing apparatus 10 is realized by cooperation between a computer that forms the document processing apparatus 10 and a program that runs on a CPU installed in the computer. In addition, the document memory 16 is realized by memory installed in the document processing apparatus 10.

In addition, programs used in the present exemplary embodiment may be provided not only by a communication unit but also by being stored in a computer-readable recording medium such as compact-disc read-only memory (CD-ROM) or universal serial bus (USB) memory. Programs provided by a communication unit or a recording medium are installed in a computer, and a CPU of the computer sequentially executes the programs, thereby realizing various processes.

Using one of the document processing apparatuses 10, a user performs checking and correction work of checking the details of a document stored in the specific document storage area of the document memory 22, and making corrections as needed. Basically, it is only necessary to perform checking and correction processing once on one document by one user; however, to improve the checking accuracy, checking and correction work may be performed multiple times on one document by one user or different users. Note that there are cases where a plurality of users share a plurality of documents to concurrently perform document checking and correction work.

Note that checking and correction work refers to work performed by a user using functional processing provided by each document processing apparatus 10 at the time of document checking and correction. In addition, checking and correction processing refers to processing executed by each document processing apparatus 10 at the time of document checking and correction work. However, these terms need not be distinguishably used in a strict manner.

In the present exemplary embodiment, forms will be described as an example of documents. The term "form" refers to one form of document, and, in the present exemplary embodiment, refers to a document filled by a user by handwriting in a predetermined format. Other documents filled by users by handwriting include questionnaires, besides forms. Since only forms are handled as documents in the present exemplary embodiment, the term "document" and the term "form" are synonyms in the following description.

Next, document checking and correction work performed by a user will be described.

A user performs a certain operation for performing checking and correction work, obtains a form to be subjected to the checking and correction work from the document management server 20, and displays a form selecting screen on the display of a document processing apparatus 10.

Figure 2:
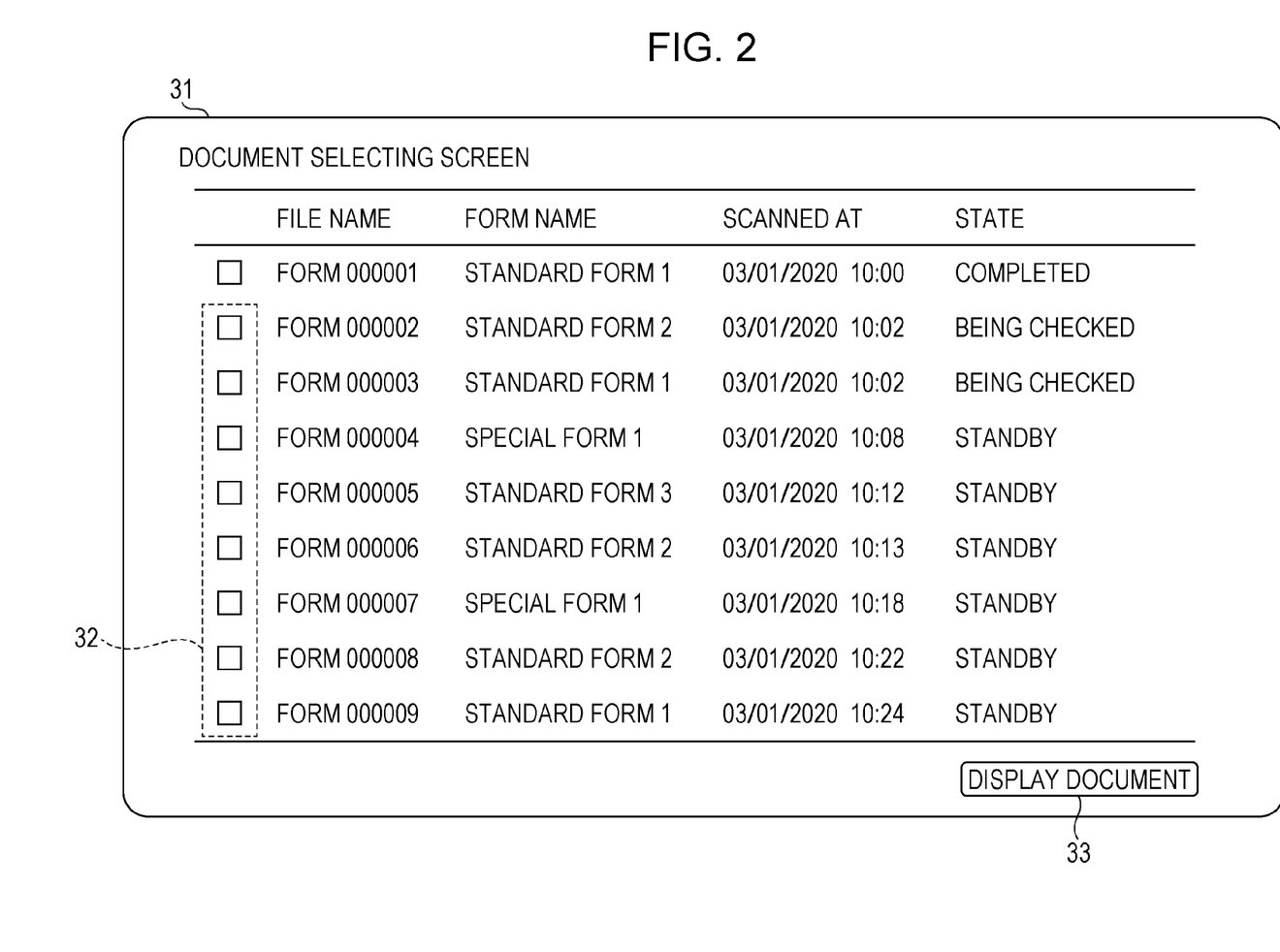
FIG. 2 is a diagram illustrating an example of the display of a document selecting screen according to the present exemplary embodiment.

FIG. 2 is a diagram illustrating an example of the display of a document selecting screen according to the present exemplary embodiment. A document selecting screen 31 serving as a first screen displays a list of documents stored in the specific document storage area of the document memory 22. FIG. 2 illustrates an example in which, as information regarding each document, the file name, form name, date and time of scanning, and state are displayed. These displayed items are only one example and need not be limited to the above. The file name is the file name of a document. The form name is a name indicating the form of a form. Therefore, as illustrated by way of example in FIG. 2, document files may have a common form name. The date and time of scanning is the date and time at which a form was read by a scanner to generate image data. In the present exemplary embodiment, the date and time of scanning is synonymous with the date and time at which a form was registered in the specific document storage area because the form is scanned and stored in the specific document storage area at the same time. The state indicates the state of a form. Exemplary states include the following: the state in which the form has been read and subjected to character recognition processing; the state in which the form has been stored in the specific document storage area and is waiting to be subjected to document checking and correction processing ("standby" in FIG. 2); the state in which the form has been selected by a user and is subjected to checking and correction processing ("being checked" in FIG. 2); and the state in which checking and correction processing on the form is completed ("completed" in FIG. 2).

Checkboxes 32 are displayed in association with displayed rows of documents. Note that the checkbox 32 of a processed document is displayed as unselectable. The user checks a checkbox 32 corresponding to a to-be-processed document and selects a document display button 33. In the present exemplary embodiment, if all the checkboxes 32 are not checked, it is considered that all the forms are selected. Here, it is assumed that the user selects the document display button 33 without checking all the checkboxes 32.

In response to selection of the document display button 33, the document obtaining unit 11 obtains a corresponding document file from the document management server 20 and saves the document file in the document memory 16.

Figure 3:
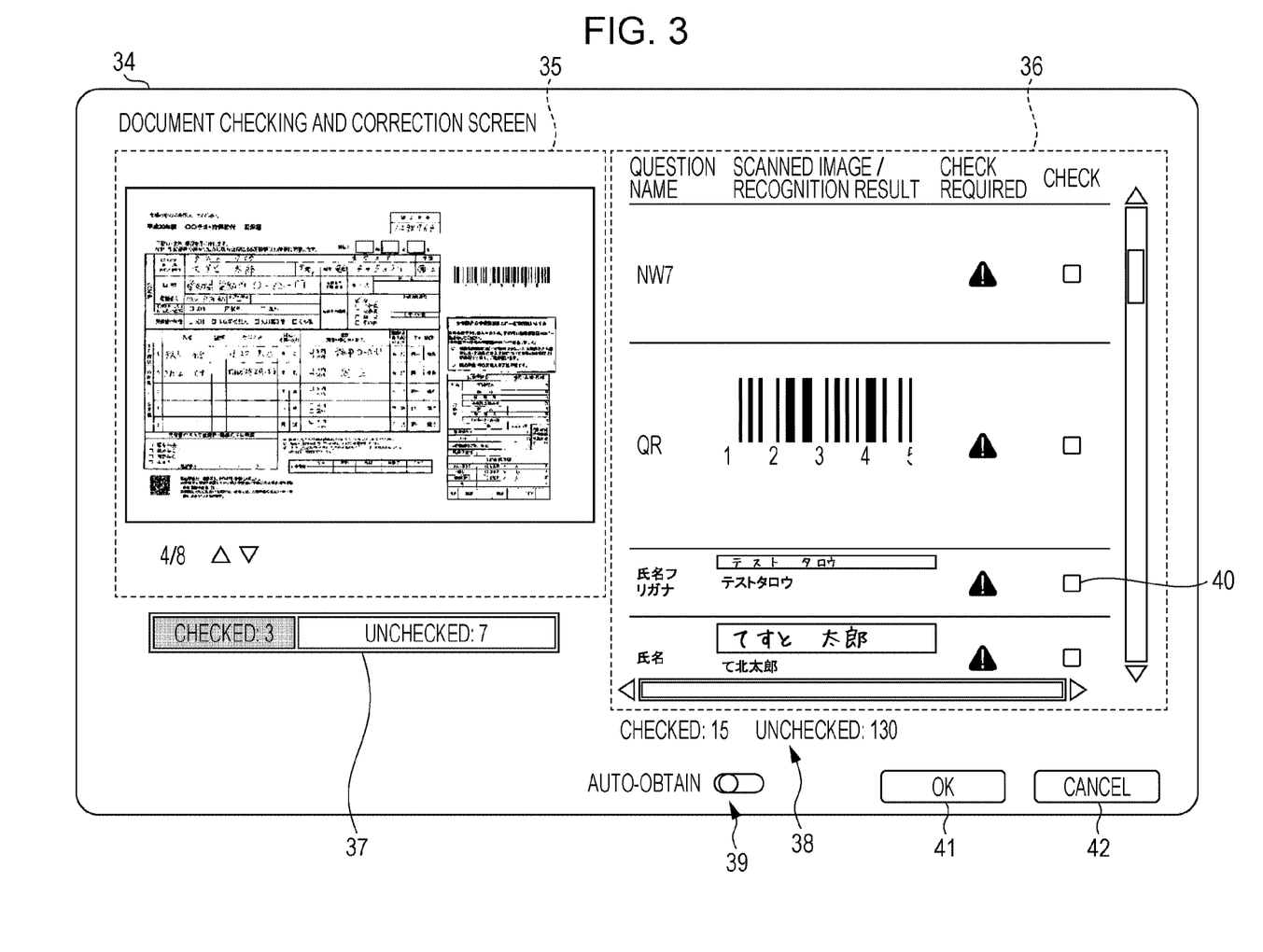
FIG. 3 is a diagram illustrating an example of the display of a document checking and correction screen according to the present exemplary embodiment.

FIG. 3 is a diagram illustrating an example of the display of a document checking and correction screen displayed in response to selection of the document display button 33 illustrated in FIG. 2. On a document checking and correction screen 34 serving as a second screen, a form display area 35 for displaying a document file obtained by the document obtaining unit 11, that is, an image of a form, and a checking and correction area 36 for the user to check the details of the form and to make corrections as needed are displayed. Handwritten characters on the form are subjected to character recognition processing. In the checking and correction area 36, an image of handwritten characters serving as an item to be checked, and the character recognition result are lined up and displayed. By referring to the checking and correction area 36, the user may check the details filled in the form. As a result of comparison between the handwritten characters and the character recognition result, the user checks whether the character recognition result matches the handwritten characters. If the character recognition result does not match the handwritten characters, the user corrects the character recognition result. The document checking and correction processor 12 allows the user to perform, in the checking and correction area 36, checking and correction work on the form displayed in the form display area 35.

Furthermore, information indicating the amount processed by checking and correction work performed by the user is displayed on the document checking and correction screen 34 illustrated in FIG. 3. The document checking and correction processor 12 displays a number-of-processed-form indicator 37 as information indicating the processed amount. The number-of-processed-form indicator 37 distinguishably indicates, out of forms obtained by the document obtaining unit 11 as to-be-processed targets, the number of checked forms ("checked") and the number of unchecked forms ("unchecked"). In addition, a form includes one or more to-be-checked items. The document checking and correction processor 12 displays all the items included in all the forms as number-of-checked-item information 38, which distinguishably indicates the number of checked items ("checked") and the number of unchecked items ("unchecked"). The number-of-checked-item information 38 may alternatively be displayed by a user interface such as the number-of-processed-form indicator 37. Although both the checked amount and the unchecked amount are indicated in the present exemplary embodiment, at least one of the checked amount and the unchecked amount may be indicated. A displayed component of an auto-obtain selector switch 39 will be described later.

After completing checking and correction on an item displayed in the checking and correction area 36, the user checks a checkbox 40 corresponding to the item. The document checking and correction processor 12 updates the number-of-checked-item information 38 every time a checkbox 40 is checked. In response to completion of checking and correction on all the items included in one form, the user selects an OK button 41. Alternatively, the user may process multiple forms together and then select the OK button 41.

In response to selection of the OK button 41, the document checking and correction processor 12 sends a checked and corrected form to the document management server 20. The document management server 20 saves the sent form in the specific document storage area. After sending the checked and corrected form to the document management server 20, the document checking and correction processor 12 updates the number-of-processed-form indicator 37.

Figure 4:
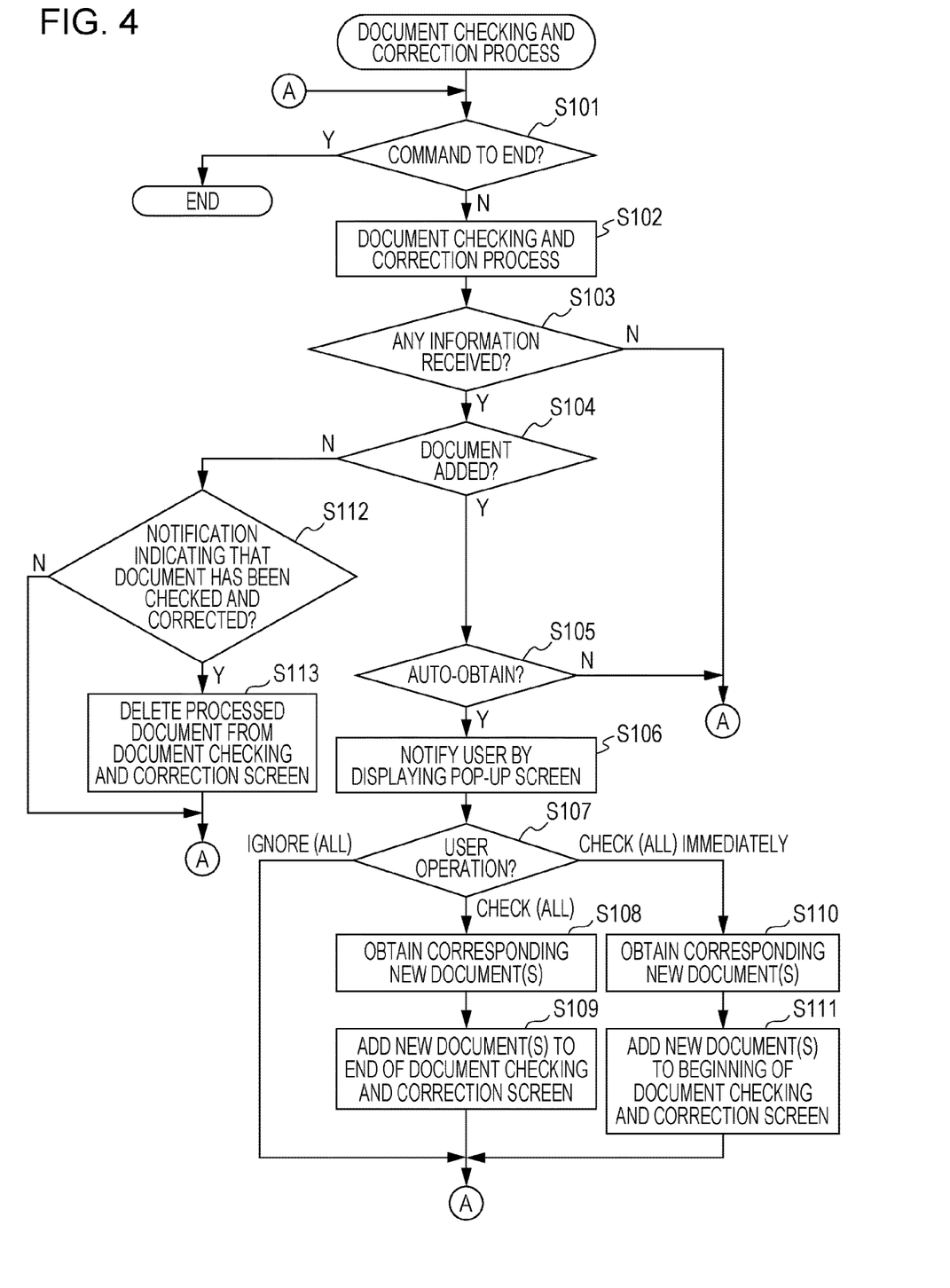
FIG. 4 is a flowchart illustrating a document checking and correction process according to the present exemplary embodiment.

Hereinafter, a document checking and correction process in the case where the user performs document checking and correction work on the document checking and correction screen 34 will be described using a flowchart illustrated in FIG. 4.

Although the controller 15 allows the display controller 142 to display the document selecting screen 31, the document checking and correction screen 34, and a later-described pop-up screen 51 in cooperation with the document obtaining unit 11 and the document checking and correction processor 12, for the sake of simplification of the description, the following description assumes that the document obtaining unit 11 or the document checking and correction processor 12, which is the core of a screen displaying process, displays a screen. Similarly, although a user operation or information input on a screen is received by the operation receiving unit 141, and the document obtaining unit 11 and the document checking and correction processor 12 receive the information received by the operation receiving unit 141 and perform certain operation, for the sake of simplification of the description, the following description assumes that the document obtaining unit 11 or the document checking and correction processor 12 receives information.

In addition, the added document monitoring unit 13 always or regularly monitors whether a document is newly added and registered in the specific document storage area of the document memory 22 of the document management server 20 while a document checking and correction process is being performed. Alternatively, in response to detection by the document management server 20 of document registration in the specific document storage area, the added document monitoring unit 13 may be notified thereof at that time or on a regular basis, and, the added document monitoring unit 13 may detect that, by receiving the notification, a document has been newly added and registered in the specific document storage area.

The document checking and correction process repeats a later-described process until the user selects the OK button (N in step S101), and ends the process in response to selection of the OK button 41 (Y in step S101). In response to selection of a cancel button 42, it is determined that the document checking and correction process has been interrupted, and the document checking and correction process ends.

The user selects the OK button 41 when having checked and corrected all the selected forms. In response to this user operation, the document checking and correction processor 12 sends the temporarily held processing details of the document checking and correction process to the document management server 20. In response to this, the state of the processed forms proceeds to "completed".

As described above, the document checking and correction processor 12 displays to-be-checked items of a to-be-processed form in the checking and correction area 36, and performs a document checking and correction process of allowing the user to perform the above-mentioned checking and correction work (step S102).

If the document processing apparatus 10 receives no information while the document checking and correction work is being performed (N in step S103), the document checking and correction processor 12 allows the user to continuously perform the checking and correction work.

Here, in the case where the document processing apparatus 10 receives some information (Y in step S103), in response to detection of addition and registration of a new document in the specific document storage area of the document memory 22 (Y in step S104), the document checking and correction processor 12 advances the process to step S101 if the user has not selected an auto-obtain mode (N in step S105).

By the way, the user may select whether to allow the document checking and correction process to operate in the auto-obtain mode by using the above-mentioned auto-obtain selector switch 39. The auto-obtain mode is the mode in which, in response to new registration of a document in the specific document storage area, the document is automatically displayed on the document checking and correction screen 34. If the user operates the auto-obtain selector switch 39 to select OFF, the document checking and correction processor 12 receives the selection and does not allow the document checking and correction process to operate in the auto-obtain mode. In contrast, if the user operates the auto-obtain selector switch 39 to select ON, the document checking and correction processor 12 receives the selection and allows the document checking and correction process to operate in the auto-obtain mode.

In the case where the user selects operation in the auto-obtain mode (Y in step S105), the document checking and correction processor 12 displays the document that has been added and registered in the specific document storage area; before doing that, the document checking and correction processor 12 displays a pop-up screen on the document checking and correction screen 34 (step S106).

FIG. 5 is a diagram illustrating an example of the display of a pop-up screen according to the present exemplary embodiment. On a pop-up screen 51, a new document display area 52 for displaying a list of documents that have been newly added and registered in the specific document storage area (hereinafter may alternatively be referred to as "new documents"), and a form display area 53 for displaying an image of a form are displayed. In the new document display area 52, the file name of a document newly added and registered in the specific document storage area, and the date and time of addition at which the document was registered in the specific document storage area, are displayed in association with each new document. File names are displayed as selectable. If the user selects any of the file names, the document checking and correction processor 12 causes the document obtaining unit 11 to obtain the selected document from the document management server 20, and displays an image of the document in the form display area 53. Note that the form display area 53 need not be displayed on the screen until the user selects a file name.

In addition, buttons 54, 55, and 56 for "check", "check immediately", and "ignore", respectively, are displayed in association with each new document. Furthermore, buttons 57, 58, and 59 for "check all", "check all immediately", and "ignore all", respectively, are displayed in the new document display area 52. By selecting any of the buttons 54 to 59 displayed on the pop-up screen 51, the user gives a command to handle one or more new documents, and the document checking and correction processor 12 receives the command for the new document(s) given by the user performing a button operation.

By the way, as described above, a document regarded by the user as a target to be processed is captured and displayed in the form display area 35 on the document checking and correction screen 34. Although only one form is displayed in FIG. 3, since forms are switchably displayable, it may also be said that a to-be-processed document is displayed as selectable on the document checking and correction screen 34. In addition, because to-be-checked-and-corrected items included in a to-be-processed document are displayed as scrollable in the checking and correction area 36, it may also be said that a to-be-processed document is displayed.

If the user selects the "check" button 54 of any of new documents (check (all) in step S107), the document checking and correction processor 12 obtains a new document corresponding to the selected "check" button 54 from the document management server 20 and saves the new document in the document memory 16 (step S108), and the document checking and correction processor 12 adds and displays the new document at the end of one or more documents that are already displayed on the document checking and correction screen 34 (step S109). Accordingly, the user may process new documents in the order in which they were obtained.

If the user selects the "check immediately" button 55 of any of new documents (check (all) immediately in step S107), the document checking and correction processor 12 obtains a new document corresponding to the selected "check immediately" button 55 from the document management server 20 and saves the new document in the document memory 16 (step S110), and the document checking and correction processor 12 adds and displays the new document immediately after a document being checked and corrected by the user, in a sequence of documents that are already displayed on the document checking and correction screen 34 (step S111). That is, in response to completion of a checking and correction process on items included in a document regarded by the user as a target to be processed, the user may regard a newly added document as a target to be processed without performing a special operation such as a scroll operation. Accordingly, the user may process a new document with top priority and efficiently. In addition, the user may add a newly added document immediately before a document being checked and corrected by the user, display the newly added document as a to-be-processed target, and, after completing checking and correction of the newly added document, resume the process on the document that was originally being checked and corrected. That is, the process on a document regarded by the user as a target to be processed may be suspended, and a newly added document may serve as a target to be processed. Accordingly, the user may preferentially process a new document over a document being checked and corrected by the user, which allows handling of a document that requires urgent processing.

If the user selects the "ignore" button 56 of any of new documents (ignore (all) in step S107), the document checking and correction processor 12 does not obtain a new document corresponding to the selected "ignore" button 56. That is, no new document is displayed on the document checking and correction screen 34. Accordingly, the user may not regard a new document as a target of checking and correction work. If the user further presses the "ignore" button 56, a new document corresponding to the "ignore" button 56 may be deleted from the new document display area 52. Accordingly, the user may more easily check new documents in the new document display area 52.

Because the above-mentioned buttons 54, 55, and 56 for "check", "check immediately", and "ignore", respectively, are provided in association with each new document, if the user wants to handle all the new documents in the same way, the user is required to repeat the same operation for the number of the new documents. To this end, if the user wants to process all the new documents in the same way, it is convenient to select any of the buttons 57, 58, and 59 for "check all", "check all immediately", and "ignore all", respectively.

That is, if the user selects the "check all" button 57 (check (all) in step S107), the document checking and correction processor 12 obtains all the new documents displayed in the new document display area 52 from the document management server 20 and saves the new documents in the document memory 16 (step S108), and the document checking and correction processor 12 adds and displays the new documents at the end of one or more documents that are already displayed on the document checking and correction screen 34 (step S109). If the user selects the "check all immediately" button 58 (check (all) immediately in step S107), the document checking and correction processor 12 obtains all the new documents displayed in the new document display area 52 from the document management server 20 and saves the new documents in the document memory 16 (step S110), and the document checking and correction processor 12 adds and displays the new documents immediately after a document being checked and corrected by the user, in a sequence of documents that are already displayed on the document checking and correction screen 34 (step S111). Note that the user may add newly added documents immediately before a document being checked and corrected by the user, display the newly added documents as targets to be checked and edited, and, after checking and correction of the newly added documents is completed, resume the process on the document that was originally checked and corrected.

Although new documents are basically displayed in the order in which they are displayed in the new document display area 52, the order of displaying the new documents may be changed. In addition, if the user selects the "ignore all" button 59 (ignore (all) in step S107), the document checking and correction processor 12 obtains no new documents. That is, no new documents are displayed on the document checking and correction screen 34. If the user further presses the "ignore" button 56, a new document corresponding to the "ignore" button 56 may be deleted from the new document display area 52.

When the user selects a close button 60 after deciding on how to handle new documents and performing the above-mentioned button operation, the document checking and correction processor 12 erases the pop-up screen 51. Alternatively, the pop-up screen 51 may be erased by selecting the close button 60 without having the user perform the above-mentioned button operation. In addition, one or more new documents may be displayed on the document checking and correction screen 34 when the user presses the button 54, 55, 57, or 58, or the pop-up screen 51 may be erased when the user presses any of the buttons 57 to 59. In addition, in response to selection of an update button 61, the document checking and correction processor 12 obtains a new document added to the specific document storage area after displaying the pop-up screen 51, thereby updating the display of the new document display area 52.

In the present exemplary embodiment, in the case of operation in the auto-obtain mode (Y in step S105), if a document is added and registered in the specific document storage area, the document checking and correction processor 12 displays the pop-up screen 51 (step S106). Alternatively, a new document may be automatically displayed on the document checking and correction screen 34 without displaying the pop-up screen 51. In this case, because the user is not allowed to select the display position of a new document, that is, either immediately after a document being processed or at the end of a sequence of displayed documents, the user may be allowed to, for example, set the display position of a new document beforehand.

In response to addition of a new document and displaying of the new document on the document checking and correction screen 34 as described above, the document checking and correction processor 12 updates the display of the number-of-processed-form indicator 37 and the number-of-checked-item information 38 in accordance with the addition of the new document. Accordingly, even in the case where a new document is automatically added as a to-be-displayed target, the user may grasp a total amount to be processed and an unprocessed amount.

By the way, as described above, since the specific document storage area is shared by a plurality of users, there is a possibility that another user is concurrently performing document checking and correction work. In this case, one document may be processed by a plurality of users, but it is not efficient for a user to check and correct a document that has been checked and corrected by another user in the same manner.

To this end, in response to completion of a checking and correction process on a form during execution of the document checking and correction process (step S102), the document checking and correction processor 12 may indicate to other users that the checking and correction process has been completed. For example, other users are notified of a checked and corrected form. That is, the file name of a form that has been checked and corrected is sent to the document processing apparatuses 10 used by other users.

On receipt of notification indicating that a form has been checked and corrected from another document processing apparatus 10 (N in step S104 and Y in step S112), if the checked and corrected form is being displayed on the document checking and correction screen 34 and the user has not performed checking and correction of the form, the document checking and correction processor 12 indicates to the user that the form has been checked and corrected by another user. For example, the form is deleted from the document checking and correction screen 34 (step S113). Accordingly, other users are relieved from performing repeated checking and correction of the checked and corrected form. Although the document checking and correction processor 12 automatically deletes a checked and corrected document here, receipt of the notification indicating may only be displayed on the document checking and correction screen 34, and the process itself of deleting the displayed form from the document checking and correction screen 34 may be performed by the user.

In response to deletion of the form, the document checking and correction processor 12 updates the display of the number-of-processed-form indicator 37 and the number-of-checked-item information 38 in accordance with deletion of the form. Accordingly, even in response to automatic deletion of a form, the user may grasp a total amount to be processed and an unprocessed amount.

Although one document processing apparatus 10 directly notifies document processing apparatuses 10 used by other users in the above description, the document processing apparatuses 10 may be indirectly notified via the document management server 20 by sending the notification to the document management server 20.

That is, when the document management server 20 receives a notification indicating that a form has been checked and corrected from one document processing apparatus 10, the editing controller 21 notifies all the document processing apparatuses 10 that the form has been checked and corrected. Note that the editing controller 21 may exclude the document processing apparatus 10 that has sent the notification that the form has been checked and corrected from those being notified.

In addition, although the document management server 20 is notified by a document processing apparatus 10 that a form has been checked and corrected, sending of a checked and corrected form from a document processing apparatus 10 may be regarded as the above-mentioned notification. In this case, the document processing apparatus 10 is not required to send the notification.

Since what is received from the outside during execution of a document checking and correction process in the present exemplary embodiment is only a notification that a new document has been added and a form has been checked and corrected, the process proceeds to step S101 on receipt of other notifications (N in step S112).

As described above, according to the present exemplary embodiment, even in the case where a document is newly added and registered in the specific document storage area while the user is executing document checking and correction work, the user may display a new document on the document checking and correction screen 34 even without displaying the document selecting screen 31 illustrated in FIG. 3 to select a document to be displayed on the document checking and correction screen 34.

In the document processing system illustrated in FIG. 1, the document checking and correction processor 12 is provided in the document processing apparatus 10 in order for a user who uses the document processing apparatus 10 to perform document checking and correction work. However, the system configuration is not limited to the above.

For example, the elements 11 to 13 and 15 other than the user interface processor 14 are provided in the document management server 20. Since the document management server 20 includes the document memory 22, the document memory 16 becomes unnecessary. The document processing apparatus 10 may be configured to display the document selecting screen 31, the document checking and correction screen 34, and the pop-up screen 51, provided by a checking and correction processing function of the document management server 20 using a browser, on a display of the document processing apparatus 10.

In the embodiment(s) above, the term "processor" refers to hardware in a broad sense. Examples of the processor include general processors (e.g., CPU: Central Processing Unit), and dedicated processors (e.g., GPU: Graphics Processing Unit, ASIC: Application Integrated Circuit, FPGA: Field Programmable Gate Array, and programmable logic device).

In the embodiment(s) above, the term "processor" is broad enough to encompass one processor or plural processors in collaboration which are located physically apart from each other but may work cooperatively. The order of operations of the processor is not limited to one described in the embodiment(s) above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A document processing apparatus comprising:
   a processor configured to:
   display one or more documents stored in a specific document storage area on a first screen;
   display a content of a first document selected on the first screen on a second screen that receives an operation for certain document processing; and
   during execution of the document processing, when new documents are stored in the specific document storage area and without receiving a command from a user to perform document processing on second documents, display names of the new documents as the second documents on a pop-up screen,
   wherein the pop-up screen comprises a new document display area and a check all immediately button,
   in the new document display area, file names of new documents added and registered in the specific document storage area, and date and time of addition at which the new documents were added and registered in the specific document storage area, are displayed,
   in response to the check all immediately button is selected, the new documents are added immediately after the first document in a sequence of documents that are already displayed on the second screen.

2. The document processing apparatus according to claim 1, wherein the processor receives from the user a command regarding the document processing on the second document before displaying the second document on the second screen.

3. The document processing apparatus according to claim 2, wherein, on receipt of a command from the user to preferentially perform document processing on the second document, the processor displays the second document preferentially over the first document displayed on the second screen.

4. The document processing apparatus according to claim 2, wherein, on receipt of the command from the user to not perform document processing on the second document, the processor does not display the second document on the second screen.

5. The document processing apparatus according to claim 1, wherein the processor receives from a user selection of whether to automatically display the second document on the second screen.

6. The document processing apparatus according to claim 1, wherein the processor displays information indicating a number of processes performed by the user on the second screen.

7. The document processing apparatus according to claim 6, wherein the processor displays at least one of a number of documents on which the user has performed the document processing and a number of documents on which the user has not performed the document processing.

8. The document processing apparatus according to claim 6, wherein, in a case where a content of a document displayed on the second screen include one or more items regarded by the user as targets to be processed, the processor displays, on the second screen, at least one of a number of items on which the user has performed the document processing and a number of items on which the user has not performed the document processing.

9. The document processing apparatus according to claim 1, wherein, in a case where the specific document storage area is shared with another user, when the user performs the document processing on a document displayed on the second screen, the processor indicates to the another user that the document processing has been performed on the document.

10. The document processing apparatus according to claim 9, wherein, by deleting from a sequence of documents to be checked and corrected a document on which the document processing has been performed by the another user, the processor indicates to the user that the document processing has been performed on the document.

11. The document processing apparatus according to claim 1, wherein the pop-up screen further comprises a check all button,
in response to the check all button is selected, the new documents are added at the end of a sequence of documents to be checked and corrected, wherein the sequence of the documents to be checked and corrected is after the first document.

12. The document processing apparatus according to claim 1, wherein the pop-up screen further comprises an ignore all button,
in response to the ignore all button is selected, the new documents are not added to the sequence of the documents to be checked and corrected, wherein the sequence of the documents to be checked and corrected is after the first document.

13. A non-transitory computer readable medium storing a program causing a computer to execute a process, the process comprising:
displaying one or more documents stored in a specific document storage area on a first screen;
displaying a content of a first document selected on the first screen on a second screen that receives an operation for certain document processing; and
during execution of the document processing, when new documents are stored in the specific document storage area and without receiving a command from a user to perform document processing on second documents, displaying names of the new documents as the second documents on a pop-up screen,
wherein the pop-up screen comprises a new document display area and a check all immediately button,
in the new document display area, file names of new documents added and registered in the specific document storage area, and date and time of addition at which the new documents were added and registered in the specific document storage area, are displayed,
in response to the check all immediately button is selected, the new documents are added immediately after the first document in a sequence of documents that are already displayed on the second screen.

* * * * *